United States Patent [19]

Ichige et al.

[11] Patent Number: 5,585,933
[45] Date of Patent: Dec. 17, 1996

[54] RECORDING AND/OR REPRODUCING APPARATUS FOR RECORDING AND/OR REPRODUCING IMAGE DATA COMPRESSED ACCORDING TO DIFFERENT COMPRESSING METHODS

[75] Inventors: Kenji Ichige, Chigasaki; Takao Arai, Yokohama; Masuo Oku, Kamakura; Hiroo Okamoto, Yokohama, all of Japan

[73] Assignee: Hitachi, Ltd., Tokyo, Japan

[21] Appl. No.: 357,156

[22] Filed: Dec. 15, 1994

Related U.S. Application Data

[63] Continuation of Ser. No. 114,630, Sep. 2, 1993, abandoned.

[30] Foreign Application Priority Data

Sep. 4, 1992 [JP] Japan ................................. 4-236854

[51] Int. Cl.⁶ ............................................. H04N 5/76
[52] U.S. Cl. .................... 386/109; 348/390; 386/111; 386/112
[58] Field of Search ................................. 358/335, 310; 360/32, 33.1, 8, 9.1; 348/384, 390, 415; H04N 5/76

[56] References Cited

U.S. PATENT DOCUMENTS

| 4,862,292 | 8/1989 | Enari et al. ............................ 358/335 |
| 4,873,582 | 10/1989 | Furuhata et al. ....................... 358/335 |
| 5,150,208 | 9/1992 | Otaka et al. ............................ 358/133 |
| 5,150,432 | 9/1992 | Ueno et al. ............................ 358/135 |
| 5,237,424 | 8/1993 | Nishino et al. ........................ 358/133 |
| 5,317,413 | 5/1994 | Yanagihara ............................ 358/335 |
| 5,367,334 | 11/1994 | Nishino et al. ........................ 348/390 |

FOREIGN PATENT DOCUMENTS

| 0337650 | 10/1989 | European Pat. Off. . |
| 0465110 | 1/1992 | European Pat. Off. . |
| 0545651 | 6/1993 | European Pat. Off. . |
| 0570214 | 11/1993 | European Pat. Off. . |
| 4014744 | 11/1990 | Germany . |
| 3-240382 | 10/1991 | Japan . |

OTHER PUBLICATIONS

"A Trend of Television System of the Next Generation in Western Countries", The Institute of Television Engineers of Japan, vol. 46, No. 3, pp. 276–283 (1992).

Primary Examiner—Tommy P. Chin
Assistant Examiner—Khoi Truong
Attorney, Agent, or Firm—Antonelli, Terry, Stout & Kraus

[57] ABSTRACT

A recording and/or reproducing apparatus for recording and/or reproducing image signals compressed according to different compressing methods. This recording and/or reproducing apparatus includes a compressing circuit for compressing first image data according to a first image data compressing method, a selecting circuit supplied with the first image data thus compressed and encoded by the compressing circuit and second image data compressed and encoded according to a second image data compressing method and selecting any one of the first and second compressed image data, and a first error correction encoding circuit for error correction encoding the selected compressed image data. The recording and/or reproducing apparatus further includes a recording and/or reproducing circuit for recording and/or reproducing the error correction encoded data on and/or from a recording medium, a first error correction decoding circuit for error correction decoding the compressed image data reproduced by the recording and/or reproducing circuit, an image data expanding circuit for expanding the compressed image data that has been error-corrected by the error correction decoding circuit, and an output circuit for outputting the first image data expanded by the image data expanding circuit. The second image data has a bit rate not greater than that of the first image data.

17 Claims, 9 Drawing Sheets

|  | STANDARD TIME MODE (50 Mbps) | LONG TIME MODE (25 Mbps) |
|---|---|---|
| HDTV | 1 IMAGE × 2 HOURS | — |
| ATV (HDTV Broadcast) | 2 IMAGE × 2 HOURS | 1 IMAGE × 4 HOURS |
| EXISTING TV | — | 1 IMAGE × 4 HOURS |

RECORDING AND/OR REPRODUCING APPARATUS FOR RECORDING AND/OR REPRODUCING IMAGE DATA COMPRESSED ACCORDING TO DIFFERENT COMPRESSING METHODS

This application is a continuation of application Ser. No. 114,630 filed on Sep. 2, 1993, abandoned.

BACKGROUND OF THE INVENTION

1. Field of the Invention

The present invention relates to an apparatus for and method of recording and/or reproducing highly-compressed image data such as HDTV (high definition television) data and low-compressed image data such as existing broadcasting data with the same data rate.

2. Description of the Related Art

Improvements of television receivers and improvements of broadcasting systems have been made in various countries by various organizations and various enterprises since the existing NTSC color television broadcasting was started in 1954 in the U.S.A. Recently, the research and the development of the HDTV system have received a practical application as a new broadcasting system that intends to obtain a high picture quality and a high definition image. In Japan, the NHK (Nippon Hoso Kyokai) has proposed a Narrow MUSE (multiple sub-Nyquist sampling encoding) system and is now carrying out a test broadcasting. Also in the U.S.A., new systems for the HDTV system broadcasting are examined under the title of ATV (Advanced Television) system.

The Journal of the Institute of Television Engineers of Japan (see Vol. 46, No. 3, pp. 276–283, 1992) has already described the aforesaid ATV system under the title of "EDTV and ATV, Trends in the U.S. and European Countries." At present, six systems are proposed as the ATV systems. Of the above-mentioned six systems, four systems relate to digital broadcasting systems in which image data is converted into a variable length code by a high-efficiency coding process and then transmitted.

A conventional system called a DigiCipher system that has been proposed by GI (General Instrument) Corporation as one of the aforesaid four systems will be described below. Since an HDTV signal has an information amount several times as large as the information amount of the existing TV signal, the broadcasting system must remove a redundancy from an original signal and transmit the HDTV signal in order to effectively utilize a broadcasting band. The DigiCipher system is a hybrid system that utilizes a DCT (discrete cosine transform) processing and a motion compensation predictive coding.

FIG. 1 of the accompanying drawings shows in block form an encoding circuit of the DigiCipher system. As shown in FIG. 1, there is provided an input terminal 90 to which digital image data a is applied. The digital image data a is supplied to a difference calculator (or subtracter) 91 which calculates a difference between the digital image data a and image data b of a preceding picture that was previously processed by the motion compensation predictive coding process. Difference data from the difference calculator 91 is supplied to a DCT circuit 92, in which it is processed in a DCT (discrete cosine transform) processing fashion. The data thus processed by the DCT circuit 92 is supplied to a quantizing circuit 93, in which it is processed by the adaptive quantization processing. The data from the quantizing circuit 93 is supplied to a variable length coding (VLC) circuit 94, in which it is processed by the variable length coding processing. Then, the data thus processed by the variable length coding circuit 94 is supplied to a buffer circuit 95, in which its bit rate is smoothed. Then, a variable length code of a constant bit rate is output from an output terminal 96. The image data b is predicted image data generated through inverse quantizing circuit 97, inverse discrete cosine transform circuit 98, adder 99, frame delay circuit 100, motion compensating circuit 104, motion vector detecting circuit 103 and switching circuits 101, 102. Motion vector detecting circuit 103 detects a motion vector from image data inputted from input terminal 90 and the last frame image outputted from frame delay circuit 100, and the predicted image data is generated by motion compensating circuit 104 based on the motion vector. Switching circuit 102 is used to switch between intra frame and inter frame coding, and switching circuit 101 is used to open and close a loop cosisting of adder 99, frame delay circuit 100 and motion compensating circuit 104. The image data is converted into a two-dimensional frequency component by the DCT processing. Man's sense of sight is sensitive to the change of a low frequency component but is relatively insensitive to the change of a high frequency component. Therefore, effectively utilizing such visual characteristics of a human being, the code amount can be reduced by the adaptive quantization processing in which different quantization bit numbers are allocated to different frequencies such as when the low frequency component of the image data processed in a DCT fashion is given a long bit length and the high frequency component thereof is given a short bit length. In the variable length coding process, a frequency component that has been processed in a two-dimensional quantization fashion is rearranged into a one-dimensional data row by a predetermined method to thereby construct a zero run length (combination of the number of consecutive zeros and the values of non-zeros) which is then processed in a two-dimensional Huffman coding fashion. In the Huffman coding process, the code amount can be considerably reduced by allocating code words of code lengths corresponding to the frequency to every zero run length.

Although the data amount of the image data can be considerably compressed as described above, a problem of error propagation occurs when image data is transmitted in the broadcasting in actual practice because the output code is the variable length code data. Therefore, the variable length coded image data is further processed in an error correction encoding fashion. In this case, the variable length coded image data is added with digital audio data and additional information and then RF-modulated by a 16 QAM (quadrature amplitude modulation) or 32 QAM system for broadcasting.

When the aforesaid system becomes a reality, the development of an apparatus that can record such image data on a recording medium becomes indispensable to such system. Under the present condition, however, in order to record the ATV image data, the image data that has been compressed and encoded by the ATV receiver must be reconverted into the original image data and the restored image data must be compressed one more time by the recording apparatus, whereafter such compressed image data must be recorded and/or reproduced by the recording and/or reproducing apparatus such as a digital VTR (video tape recorder) or the like.

Furthermore, a VTR that can record and/or reproduce both of the HDTV studio signal and the ATV signal needs two decoders and two expanding apparatuses for the broadcasting system and the recording and reproducing system. There is then the problem that the circuit scale of such VTR is enlarged.

SUMMARY OF THE INVENTION

In order to attain the aforesaid objects, there is provided an image data recording and/or reproducing apparatus in which image data input as first image data is compressed by a first image compressing system, the image data thus compressed is encoded with error correction by a first error correction encoding means for a recording and/or reproducing apparatus, the image data thus encoded is recorded and/or reproduced on and/or from a recording medium, the reproduced image data is decoded with error correction by a first error correction decoding means corresponding to the first error correction encoding means, the image data thus decoded is expanded by the above-mentioned first image compressing system and the image data thus expanded is output, wherein second image data that has been compressed and encoded by a second image compressing system, i.e., a broadcasting system such as an ATV system or the like, is input thereto instead of the compressed signal and then recorded and/or reproduced.

According to another aspect of the present invention, the recording and/or reproducing mode is switched so that the first image data is recorded and/or reproduced at a high bit rate and the second image data is recorded and/or reproduced at a low bit rate.

According to still another aspect of the present invention, n (n is an integer) second image data having a bit rate of less than 1/n of the maximum bit rate for recording and reproducing are input and then multiplexed to generate one compression encoded data having the maximum bit rate for recording and reproducing. The compressed and encoded data is encoded with error correction by a recording and reproducing processing apparatus and then recorded. Upon reproducing, a reproduced signal is decoded with error correction by the recording and reproducing apparatus. Further, one image data is selected from the multiplexed image data and then output.

According to a further aspect of the present invention, when the second image data is comprised of image data concerning an image content within one frame, i.e., intraframe encoded data, and image data concerning a relationship of image contents of a plurality of frames, i.e., interframe encoded data, the interframe encoded data of the second image data is recorded in a multiplexed fashion in response to a difference between bit rates of compressed image data of the first image data and the second image data.

According to a still further aspect of the present invention, image data that has not yet been error-corrected is taken out from the inside of a receiver for the second image data and this image data is input to the above-mentioned means as the second image data.

According to a still further object of the present invention, all of the above-mentioned means additionally include one or a plurality of RF detecting (demodulating) circuits for detecting (demodulating) RF-modulated second image data.

According to a yet further aspect of the present invention, in all of the above-mentioned means that have no RF detecting (demodulating) circuit, the image data error correction decoded by the second error correction decoding system corresponding to the second image data and information concerning an error that takes place in the decoding processing are input and synthesized, thereby being recorded and/or reproduced.

Since the second image data, i.e., the compressed and encoded image data of the broadcasting system such as the ATV system or the like, is input and output under the condition of the code row that has been processed in a broadcasting system error correction encoding fashion and the code row in the above state is recorded and/or reproduced by the recording and/or reproducing apparatus such as the VTR or the like, the error correction decoding circuit and the image expanding processing circuit of the broadcasting system need not be provided in the image recording and reproducing processing apparatus side.

Since the compressed and encoded second image data is input instead of the signal that has been processed in the above first compressing processing fashion, the original image data and the compressed and encoded image data of the above-mentioned broadcasting system can both be recorded and/or reproduced by the same hardware.

When image data that results from compressing and encoding image data of high resolution such as the ATV system data or the like at a relatively low bit rate is input as the second image data and original image data of high resolution is input as the first image data, if the original image data is recorded at a high bit rate as compared with that of the second image data, then two kinds of image data can be recorded and/or reproduced without enlarging the circuit scale of the encoder circuit.

Since n (n is an integer) second image data of low bit rate are multiplexed to generate one image data of high bit rate, n independent images can be recorded on an image recording and reproducing apparatus as one image data. Upon playback, one image data is selected from the multiplexed image data, whereby one arbitrary input image data can be reproduced.

Since there are provided a plurality of RF detecting (demodulating) circuits, second image data of a plurality of channels can be obtained. By multiplexing and recording and reproducing the second image data of a plurality of channels, image data of a plurality of channels can be recorded simultaneously.

Furthermore, when the second image data is processed by the error correction encoding that requires data to be continuous, if the second image data that has been error-corrected and information concerning the error upon error correction processing are input and then recorded and/or reproduced, then continuity of the code concerning the error correction processing is removed. Thus, even if image data that becomes partly discontinuous when the VTR or the like is operated in a special playback mode is output, then an image can be displayed by the receiver for second image data.

The above and other objects, features, and advantages of the present invention will become apparent from the following detailed description of illustrative embodiments thereof to be read in conjunction with the accompanying drawings, in which like reference numerals are used to identify the same or similar parts in the several views.

DESCRIPTION OF THE PREFERRED EMBODIMENTS

The present invention will now be described in detail with reference to the accompanying drawings.

Figure 1:
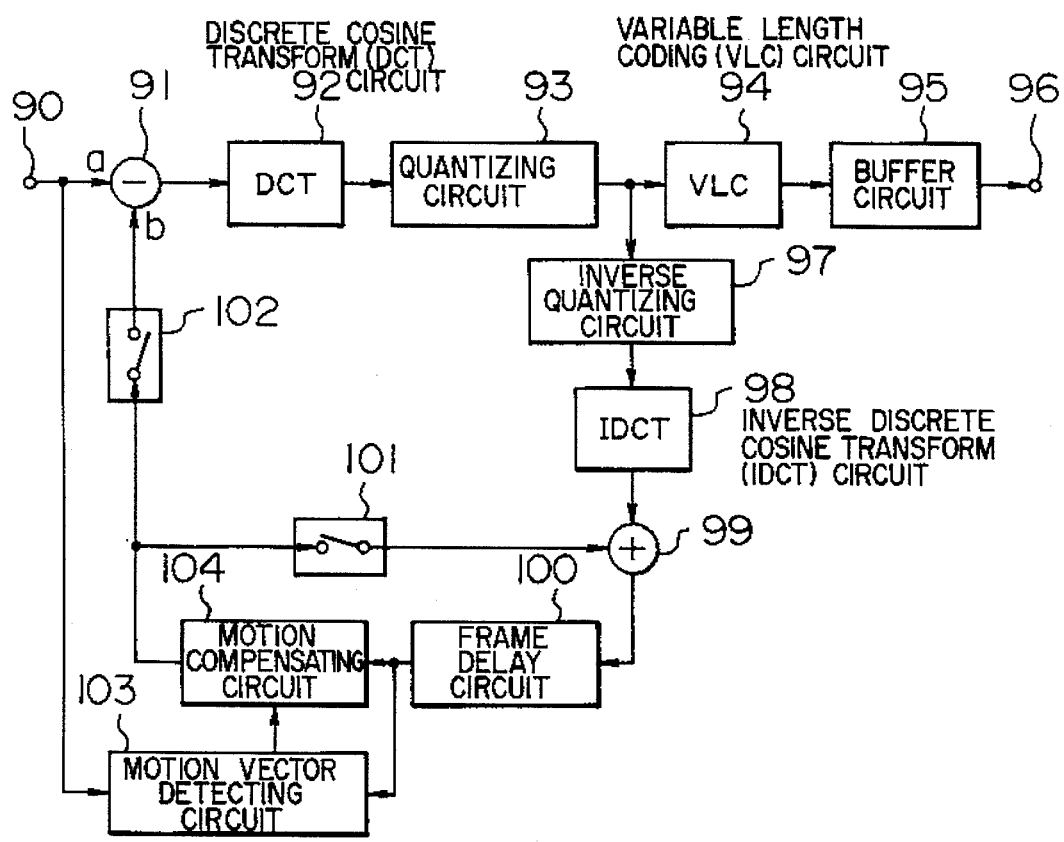
FIG. 1 is a block diagram showing a circuit arrangement of an encoding circuit of a conventional television system.
Figure 2:
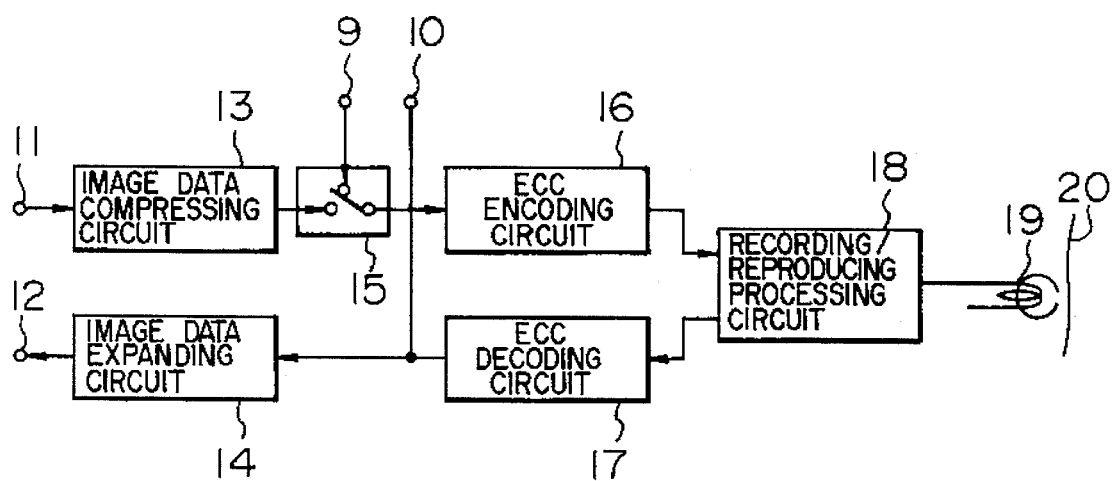
FIG. 2 is a block diagram showing a circuit arrangement of a digital video tape recorder (digital VTR) according to an embodiment of the present invention.

FIG. 2 is a block diagram showing a circuit arrangement of a digital video tape recorder according to an embodiment of the present invention. As shown in FIG. 2, there is provided an input terminal 9 to which highly-compressed image data is supplied. Low-compressed image data of a baseband such as RGB data or luminance and color difference data is supplied to an input terminal 11. The variable length coded highly-compressed image data is output from an output terminal 10. The original image data of the baseband such as RGB data or luminance and color difference data is output from an output terminal 12. The digital video tape recorder of the present invention further comprises an image data compressing circuit 13, an image data expanding circuit 14, a selector circuit 15, an error correction encoding (or ECC encoding circuit) 16, an error correction decoding circuit (or ECC decoding circuit) 17, a recording and/or reproducing circuit 18, a magnetic head 19 and a magnetic tape 20.

According to an embodiment of the present invention, an original image signal having an ordinary fixed bit length and the highly-compressed image data compressed with a high compressing rate such as ATV system data or the like can be recorded and/or reproduced by the same system. When the original image data is recorded, as shown in FIG. 2, the original image data is input to the input terminal 11 and then supplied to the image data compressing circuit 13, in which it is compressed to a compressed code. The highly-compressed variable length code is selected by the switching circuit 15 and then supplied to the ECC encoding circuit 16, in which it is added with an error correcting parity for a video tape recorder. Then, data of a code row from the ECC encoding circuit 16 is converted by the recording and/or reproducing circuit 18 into a VTR recording signal and then input to the magnetic head 19, whereby image data is magnetically recorded on the magnetic tape 20.

Meanwhile, since the highly-compressed image data that was already processed by coding processing need not be compressed, such image data is not processed by the image data compressing circuit 13 and is therefore input to this digital video tape recorder through the switching circuit 15 from the input terminal 9. Then, the aforesaid image data from the switching circuit 15 is supplied to the ECC encoding circuit 16, in which it is added with the VTR error correcting parity and then recorded by the recording and/or reproducing circuit 18.

Figure 3:
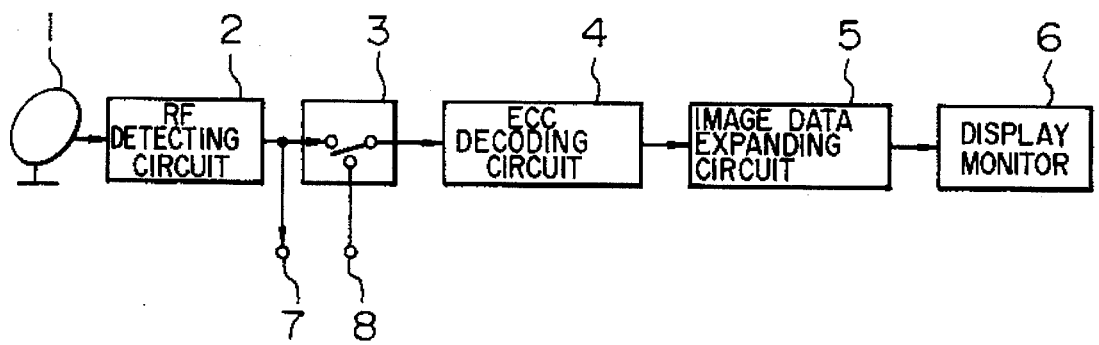
FIG. 3 is a block diagram showing a fundamental circuit arrangement of an ATV (advanced television) system receiver that can be connected to the recording and/or reproducing apparatus (digital VTR) shown in FIG. 2.

FIG. 3 is a block diagram showing a fundamental circuit arrangement of an ATV system receiver that can be connected to the recording and/or reproducing apparatus shown in FIG. 2. As shown in FIG. 3, the ATV system receiver comprises an antenna 1 which receives ATV broadcast radio waves, an RF (radio frequency) detecting (demodulating) circuit 2 which restores the RF-modulated signal, received at the antenna 1, into a baseband signal, output and input terminals 7 and 8 from and to which the compressed coded ATV baseband signal, i.e., the variable length encoded image signal, is output and input, a switching circuit 3 for switching the input of the compressed image signal, an error correction decoding circuit 4 which corrects or conceals an error caused in the image signal by a transmission system by using error correcting information contained in the ATV baseband signal, an image data expanding circuit 5 which expands the image signal compressed by the compressed code method of the ATV to provide an original image signal and a display monitor 6 which displays thereon the image data as a picture.

The highly-compressed image data output from the output terminal 10 shown in FIG. 2 can be supplied to the input terminal 8 shown in FIG. 3. The highly-compressed image data from the output terminal 7 shown in FIG. 3 can be supplied to the input terminal 9 of FIG. 2. Further, the switching circuits 15 and 3 shown in FIGS. 2 and 3 can be operated in a manual fashion in response to a signal that is recorded and/or reproduced or displayed.

Figure 4:
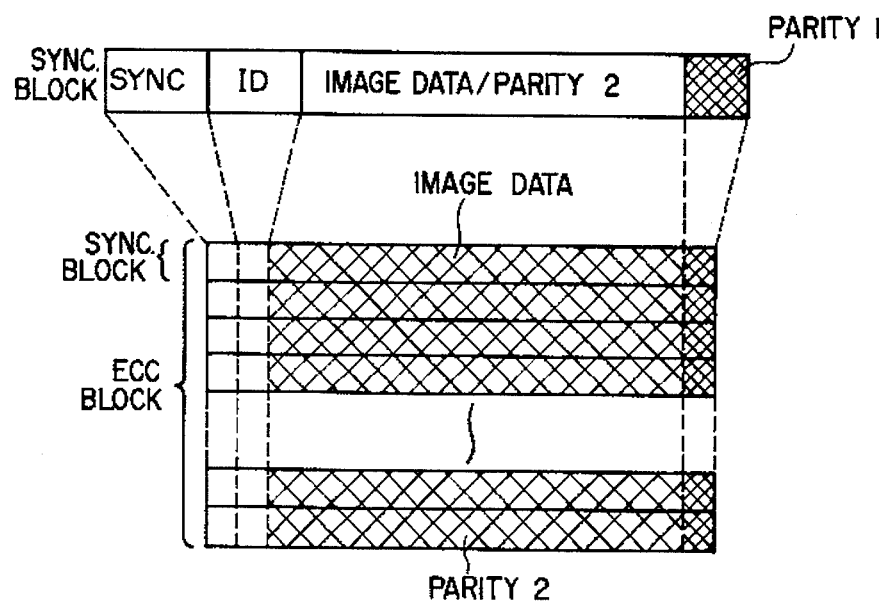
FIG. 4 is a diagram showing an arrangement of an error correcting block and to which reference will be made in explaining the operation of the present invention.

The compressed and encoded image data input and/or output from the digital VTR of this embodiment contains the error correcting parity provided according to the corresponding encoding system. In the case of the ATV system receiver shown in FIG. 3, the image data containing the ATV error correcting parity is further processed by the VTR error correction coding processing and then recorded by the VTR. FIG. 4 shows an arrangement of an error correcting block (ECC block) used in the error correction coding processing. In general, as shown in FIG. 4, one ECC block is comprised of sync. blocks of a predetermined number and one sync. block consists of image data, a parity (parity 1) for such image data, ID (identification) data ID that is identification information used to identify the position of the image data in the picture, and sync. data SYNC that is used to detect a starting position of each sync. block. In this embodiment, the ID data ID further contains therein data that is used to identify the kind of recorded image data. Therefore, upon reproducing, it can be determined by the aforesaid data whether the recorded image data is data that is compressed by the broadcasting system such as the ATV system or the like or data that is compressed by the VTR.

When the highly-compressed image data is input, image data that has been processed in the error correction decoding processing of the broadcasting system can be employed as the input signal. In this embodiment, a signal containing a broadcasting system error correcting parity that has not been error-corrected yet is employed as the input signal. The reason for this is that, when an error that cannot be corrected takes place during the transmission of the image signal, the error correction decoding must be amended by some suitable method. When such signal is recorded by the VTR, data such as an error correcting flag or the like used to identify an error concealment must be exchanged between the ATV system receiver and the VTR, which also requires a circuit for such processing. Such processing cannot offer any advantage to the recording and/or reproducing processing of the VTR.

Upon playback, the image signal is played back from the magnetic tape 20 by the magnetic head 19. Then, the reproduced image signal is supplied to the recording and/or reproducing circuit 18 and thereby processed in a playback fashion. The signal thus processed by the recording and/or reproducing circuit 18 is supplied to the ECC decoding circuit 17, in which an error is corrected and/or concealed for the VTR. The signal thus processed the ECC decoding circuit 17 is output from the output terminal 10 and is also input to the image data expanding circuit 14, in which it is processed to decode original image data from the compressed image data.

According to the digital VTR of this embodiment of the present invention, besides the original image data, the highly-compressed image data thus compressed coded transmitted in some suitable broadcasting system such as the ATV system or the like can be recorded and/or reproduced efficiently. That is to say, if the image data is recorded in the form of the highly-compressed image data, then image data can be processed by the VTR without the broadcasting system error correction decoding apparatus and the image data expanding processing circuit.

Figure 5:
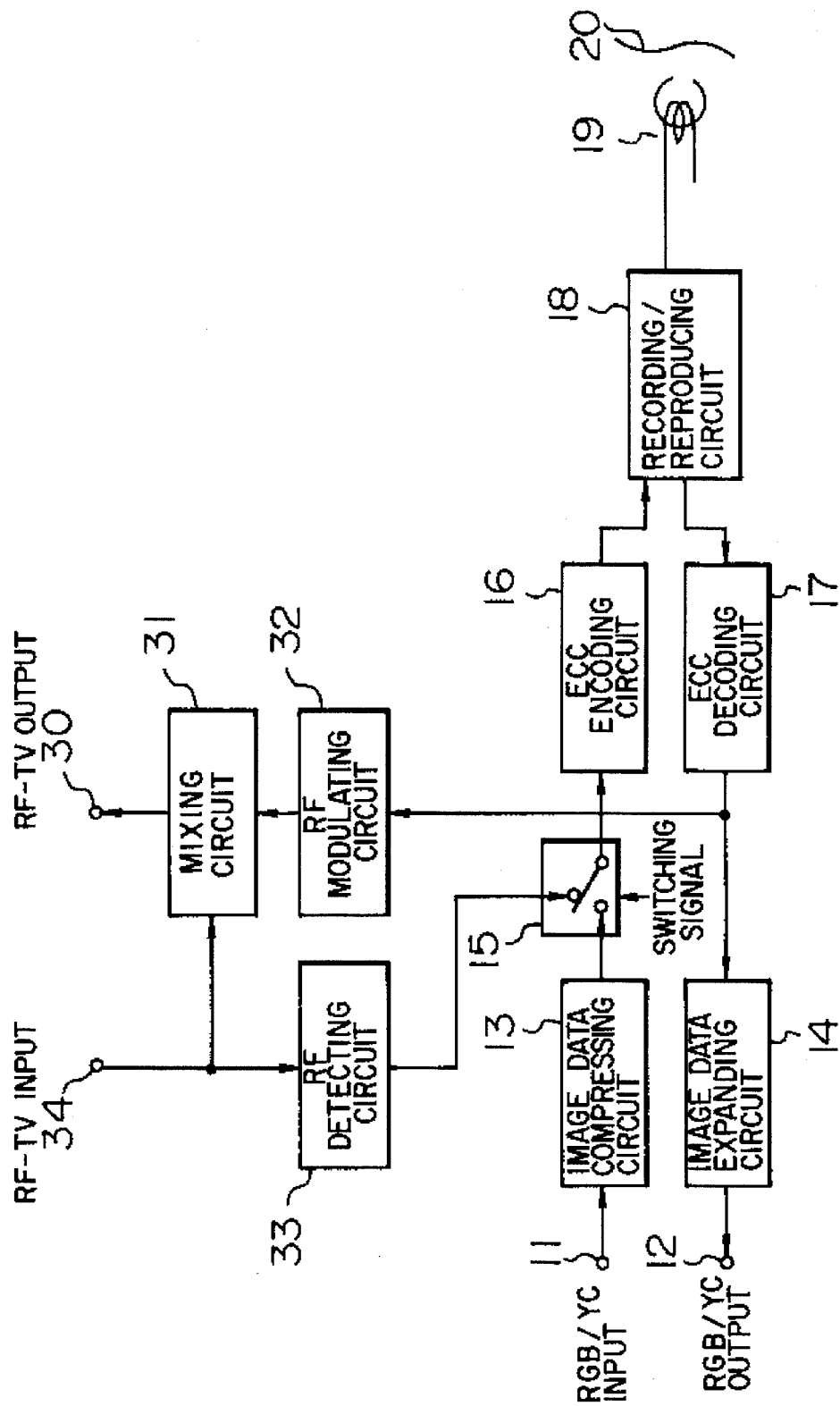
FIG. 5 is a block diagram showing the recording and/or reproducing apparatus according to another embodiment of the present invention.

FIG. 5 shows in block form a circuit arrangement of the digital VTR according to another embodiment of the present invention. As shown in FIG. 5, the digital VTR of the first embodiment shown in FIG. 2 further includes an RF detecting (demodulating) circuit 33, an RF modulating circuit 32 and a mixing circuit 31, by which a highly-compressed image signal of the broadcasting system can be input to an RF television signal input terminal 34 and output from an RF television signal output terminal 30 in an form of the RF signal, thereby being recorded and/or reproduced.

According to this embodiment of the present invention, since this digital VTR includes therein the RF detecting (demodulating) circuit 33 and the RF modulating circuit 32 in addition to the features of the digital VTR of the embodiment shown in FIG. 2, a program on a different channel can be recorded while the ATV system RF signal from the output terminal 30 is displayed on the display monitor 6 shown in FIG. 3.

Figures 6, 8:
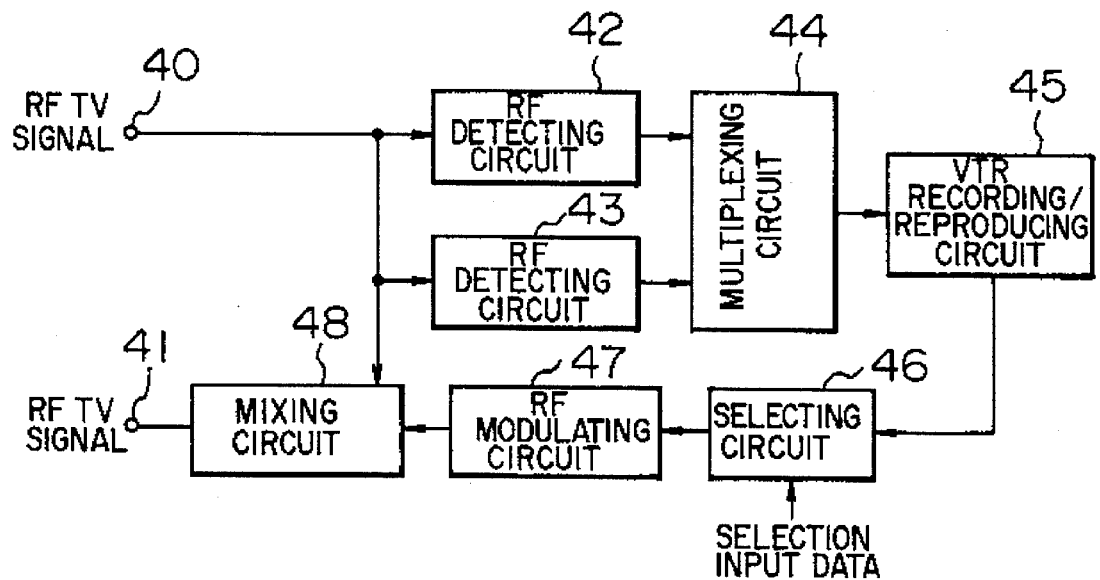
FIG. 6 is a block diagram showing the recording and/or reproducing apparatus according to still another embodiment of the present invention.
FIG. 8 is a diagram showing a recording mode of the embodiment shown in FIG. 7.

FIG. 6 shows in block form a circuit arrangement of the VTR according to still another embodiment of the present invention. As shown in FIG. 6, this VTR comprises an input terminal 40 to which there is supplied RF-modulated highly-compressed coded image data of the broadcasting system, an RF output terminal 41 from which reproduced highly-compressed coded image data is output, RF detecting (demodulating) circuits 42, 43, a multiplexing circuit 44 for multiplexing a plurality of variable length coded image data of low bit rate to produce image data of high bit rate, a VTR recording and/or reproducing circuit 45, a selecting circuit 46 for selectively extracting one image data from a plurality of image data multiplexed in the image data of high bit rate, an RF modulating circuit 47 for RF-modulating the compressed coded image data and a mixing circuit 48 for mixing an RF signal of a reproduced image into the input RF signal.

The VTR of this embodiment has a compressing function to compress the HDTV image data so that when a recording bit rate of input image data is set to be n (n is an integer of 2 or more) times or more the average bit rate of the image data transmitted in the broadcasting system, data of a plurality of channels can be recorded simultaneously.

As a specification of a VTR that can record and/or reproduce the HDTV image data, there is considered a VTR of a specification such that the ordinary baseband HDTV (high definition) signal is compressed and then recorded and/or reproduced at the bit rate of about 50 Mbits per second. Meanwhile, the ATV system image signal is transmitted at the bit rate of about 25 Mbits per second. Therefore, this VTR can record two channels of ATV system image data simultaneously. In this embodiment, the above recording bit rate is selected to be 2 times (n=2).

Further, as shown in FIG. 6, image signals of two different channels are detected (demodulated) from the RF signal supplied thereto from the input terminal 40 by the RF detecting (demodulating) circuits 42 and 43. The two highly-compressed coded image data thus detected are (demodulated) multiplexed by the multiplexing circuit 44 in a time division multiplex (TDM) fashion. Then, the multiplexed signal from the multiplexing circuit 44 is recorded and/or reproduced by the VTR recording and/or reproducing circuit 45. This processing is carried out by the circuit elements 16 to 20 in the embodiment shown in FIG. 2. The selecting circuit 46 selects one image data from the reproduced image data in response to an input selecting signal supplied thereto, and the RF modulating circuit 47 modulates the image data thus selected to output reproduced image data.

According to this embodiment of the present invention, the broadcasting system highly-compressed coded image data such as the ATV image data or the like of a plurality of channels can be recorded simultaneously.

Figure 7:
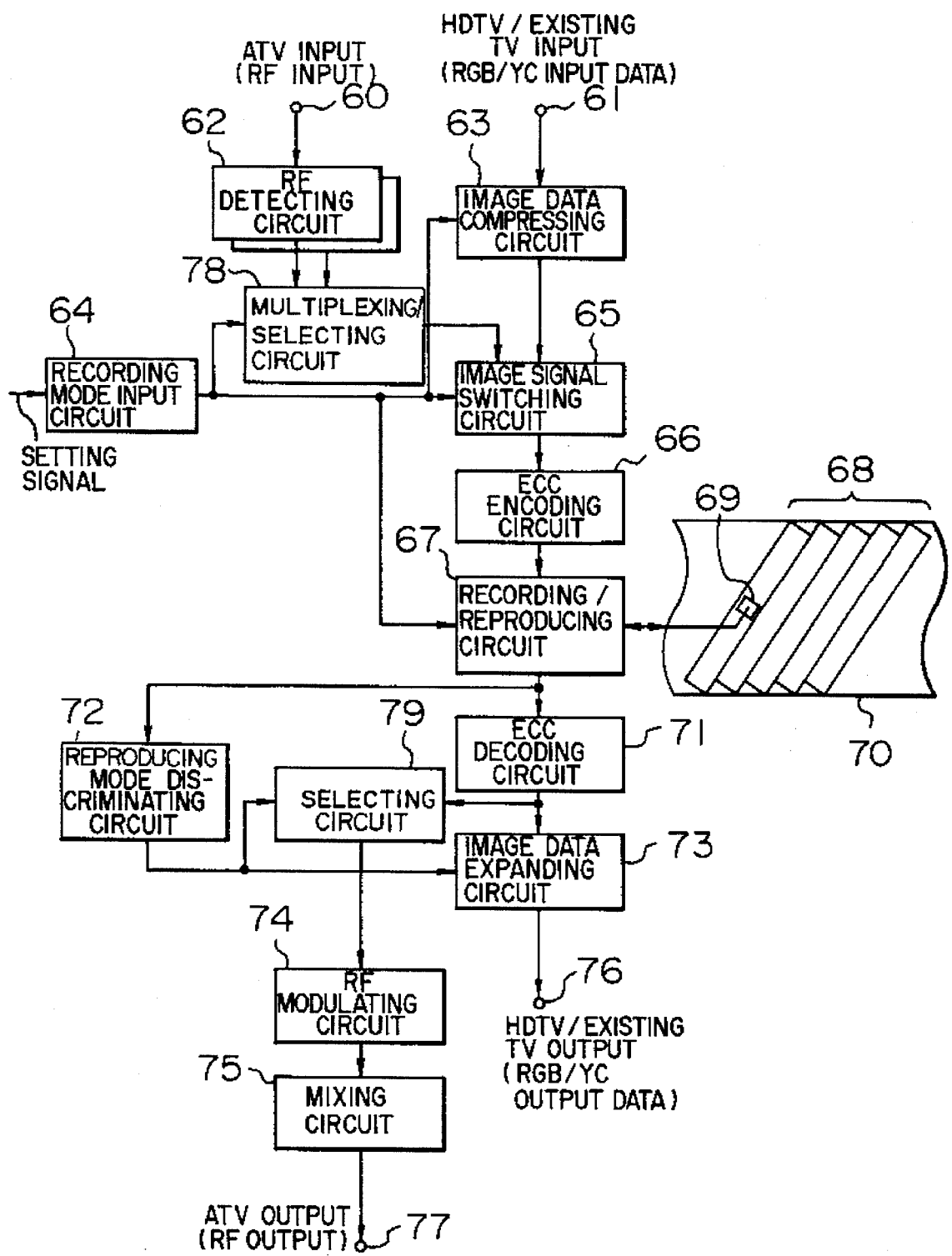
FIG. 7 is a block diagram showing the recording and/or reproducing apparatus according to another embodiment of the present invention.

FIG. 7 shows a circuit arrangement of the VTR according to another embodiment of the present invention. According to this embodiment, when the VTR has a plurality of modes in the mean bit rate of recording and reproduction, image data (original image data and compressed coded image) of one or a plurality of channels are recorded in response to the mode and then image data of one channel can be reproduced.

As a specification of the VTR that can record and/or reproduce the HDTV image data, there is considered a VTR having two recording and/or reproducing modes such as a standard time mode in which the ordinary baseband HDTV signal is compressed with a low-compressed rate and then recorded and/or reproduced at the bit rate of about 50 Mbits per second and a long time mode in which the broadcasting system highly-compressed image signal such as the ATV system signal or the like is recorded at the bit rate of about 25 Mbits per second. This VTR can record the broadcasting system image data such as the ATV system image data or the like as original image data of 25 Mbits per second for a long period of time. Also, this VTR can multiplex two data of 25 Mbits per second and record and/or reproduce the same as image data of 50 Mbits per second in the standard time mode. This embodiment intends to provide such method.

Referring to FIG. 7, the VTR of this embodiment comprises an input terminal 60 to which there is supplied an RF signal of highly-compressed ATV system image data, an input terminal 61 to which there is supplied original image data such as HDTV image data and existing TV baseband image data, an RF detecting (demodulating) circuit 62 for detecting (demodulating) one image data from a plurality of ATV system image data, an image data compressing circuit 63, a recording mode input circuit 64, an image signal switching circuit 65, an ECC encoding circuit 66, a recording/reproducing circuit 67, image recording tracks 68 that are recorded on a magnetic tape 70 by using a head 69, an ECC decoding circuit 71, a recording mode discriminating circuit 72, an image data expanding circuit 73, an RF modulating circuit 74, a mixing circuit 75 for mixing the RF signal of the reproduced image data to the input RF signal, an output terminal 76 at which there is developed HDTV or existing original TV image data, an output terminal 77 at which there is developed an RF signal of ATV system image data, a multiplexing/selecting circuit 78 for multiplexing or selecting two ATV system compressed coded image data in response to the recording mode, and a selecting circuit 79 for selecting and extracting one image data from multiplexed highly-compressed variable length coded image data.

As shown in FIG. 7, the original image data is input to the input terminal 61 and supplied to the image data compressing circuit 63, in which it is processed to provide a compressed coded code. This compressed coded code is input to the image signal switching circuit 65. On the other hand, the RF signal of the variable length coded image data is input to the input terminal 60 and then detected (demodulated) by the RF detecting (demodulating) circuit 62. In this embodiment, the RF detecting (demodulating) circuit 62 might be an RF detecting (demodulating) circuit that detects (demodulates) two channels of ATV system image data. The two compressed coded image data thus detected (demodulated) are multiplexed or selected by the multiplexing/selecting circuit 78 in response to the recording mode and then input to the image signal switching circuit 65.

FIG. 8 shows the recording modes of this embodiment. As shown in FIG. 8, two ATV system image data can be recorded at the bit rate of 50 Mbits per second for two hours in the standard time mode and also one ATV system image data can be recorded at the bit rate of 25 Mbits per second for four hours in the long time mode. Also, one HDTV image data can be recorded at the bit rate of 50 Mbits per second for two hours in the standard time mode, and one existing TV image data can be recorded at the bit rate of 25 Mbits per second for four hours in the long time mode. Although the HDTV image data can be recorded in the long time mode and the existing TV image data can be recorded in the standard time mode, they are excluded from the selection because the bit rates thereof are not proper. Further, in order to record the two existing TV image data for two hours in the standard time mode, another image data compressing processing circuit is needed, which is not advantageous in actual practice. Therefore, the standard time mode of the existing TV data also is excluded from the selection.

When the recording mode is the ATV system image data/standard time mode, the multiplexing/selecting circuit 78 multiplexes two variable length coded image data. When the recording mode is the ATV system image data/long time mode, the multiplexing/selecting circuit 78 selects one of the two input image data.

The image signal switching circuit 65 is adapted to selectively switch the compressed coded image data in response to the recording mode. The ECC encoding circuit 66 adds an error correcting parity or the like to the compressed coded image data thus selected, and the recording/reproducing circuit 67 records and/or reproduces the image data together with information concerning the recording mode. The image data thus reproduced is processed by the ECC decoding circuit 71 so that an error that took place when the recording and/or reproduction is carried out by the VTR is corrected or concealed. The mode discriminating circuit 72 determines the recording mode from the reproduced signal. When it is determined by the recording mode discriminating circuit 72 that the recording mode is the HDTV image data or existing TV image data recording mode, the image data expanding circuit 73 expands the image data in response to the recording mode. Then, the original image data is output from the output terminal 76. When it is determined by the recording mode discriminating circuit 72 that the recording mode is the ATV-standard time mode, the selecting circuit 79 selects one image data from the two image data contained in the variable length code that has been error-corrected. Further, when it is determined by the recording mode discriminating circuit 72 that the recording mode is the ATV-long time mode, the compressed coded image data that has been error-corrected is input to the RF modulating circuit 74 as it is. Then, the RF modulating circuit 74 modulates the reproduced ATV system image data to provide the RF signal. The resultant RF signal is mixed with the input RF signal by the mixing circuit 75 and then output to the output terminal 77.

According to this embodiment, the ATV system image data suitable for the respective recording modes can be carried out by the VTR that has a plurality of recording modes. That is to say, the recording mode in which one channel of image data is recorded for a long period of time or the recording mode in which image data of a plurality of channels are recorded for a short period of time can be selected.

Figure 9:
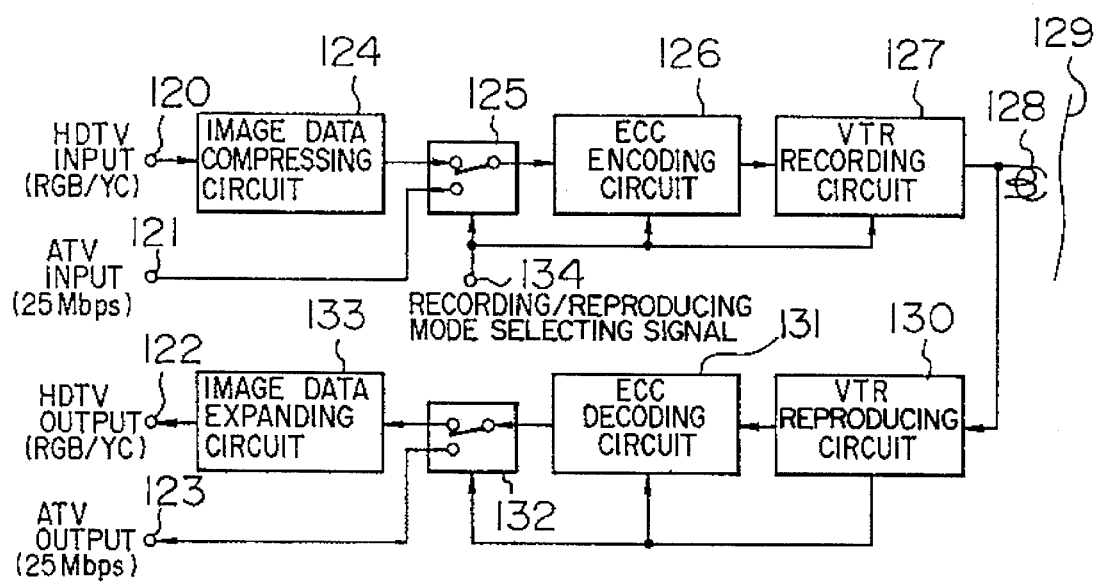
FIG. 9 is a diagram showing a circuit arrangement of an image data reproducing apparatus according to still another embodiment of the present invention.

FIG. 9 shows a circuit arrangement of a VTR according to still another embodiment of the present invention. As shown in FIG. 9, this VTR is comprised of input and output terminals 120, 122 to and from which original image data are input and output, input and output terminals 121, 123 to and from which coded image data with a highly-compressed rate such as ATV system image data or the like is input and output, an image data compressing circuit 124, switching circuits 125, 132, an ECC encoding circuit 126, an ECC decoding circuit 131, a VTR recording circuit 127, a magnetic head 128, a magnetic tape 129, a VTR reproducing circuit 130, an image data expanding circuit 133, and an input terminal 134 to which there is supplied a recording/reproducing mode selecting signal.

In the VTR that must be miniaturized such as when a VTR is formed as a built-in camera type VTR, RGB data of fixed bit length or data of luminance a signal and color difference signals cannot be compressed to the bit rate of about 25 Mbits per second of ATV system image data substantially. Therefore, according to this embodiment, input image data of highly compressed coded and input original image data are recorded and/or reproduced at different average bit rates, whereby the input image data of highly-compressed code is recorded and/or reproduced for a longer period of time. In this embodiment, an image data reproducing apparatus that has the recording and/or reproducing modes of 25 Mbits per second and 50 Mbits per second is illustrated as one example.

As shown in FIG. 9, the image data compressing circuit 124 compresses the original image data in accordance with the recording and/or reproducing mode of the high bit rate, 50 Mbits per second of the two recording and/or reproducing modes. Then, the image data thus compressed is supplied to one input terminal of the switching circuit 125. The ATV system image data of the compressed coded code is directly supplied to the other input terminal of the switching circuit 125. The switching circuit 125 responds to the recording/reproducing mode selecting signal supplied thereto from the input terminal 134 to select one of the two input image data. The selected input image data is then supplied to the ECC encoding circuit 126, in which it is processed in an error correction encoding fashion suitable for the VTR. The data thus processed by the ECC encoding circuit 126 is supplied to the VTR recording circuit 127 which then records the image data and a recording/reproducing mode identifying signal. At that time, the ECC encoding circuit 126 and the VTR recording circuit 127 are adapted to vary internal parameters in response to the recording/reproducing mode and process the data.

Upon playback, the image data and the recording/reproducing mode identifying signal are played back from the magnetic tape 129 by the magnetic head 128 in cooperation with the VTR reproducing circuit 130. The image data thus reproduced is supplied to the ECC decoding circuit 131 in response to the recording/reproducing mode, in which it is decoded in error correction code. The image data thus decoded by the ECC decoding circuit 131 is switched by the switching circuit 132 in response to the recording/reproducing mode. More specifically, the ATV reproduced data corresponding to the bit rate of 25 Mbits per second is output from the output terminal 123 in the form of the compressed coded data. On the other hand, the reproduced data corresponding to the bit rate of 50 Mbits per second is expanded by the image data expanding circuit 133 and then output from the output terminal 122 as the original image data of the fixed bit length.

According to this embodiment, the highly-compressed ATV system image data can be recorded and/or reproduced for a long period of time in the recording/reproducing mode having a lower bit rate. On the other hand, the original image data is recorded and/or reproduced in the recording/reproducing mode having a high bit rate, whereby the HDTV image data can be recorded and/or reproduced for a short period of time while the circuit scale of the recording and reproducing apparatus is kept small.

Figure 10:
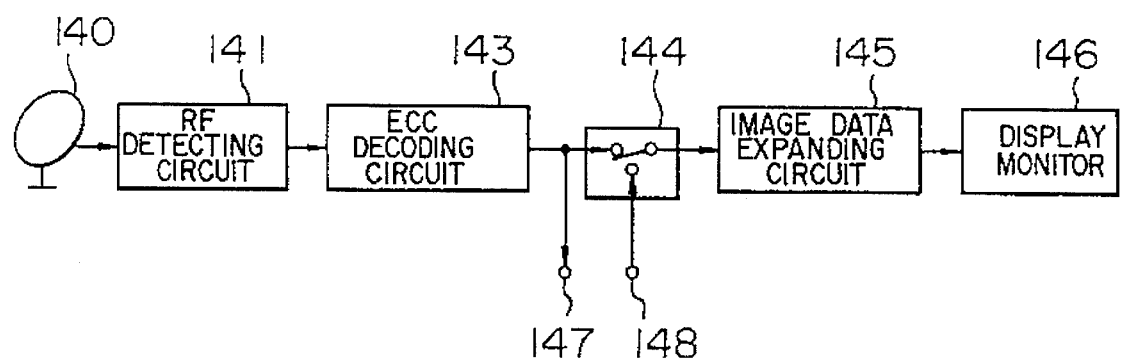
FIG. 10 is a block diagram showing a circuit arrangement of a broadcasting receiver corresponding to the embodiment shown in FIG. 9.

FIG. 10 shows a circuit arrangement of a VTR according to a further embodiment of the present invention. In this embodiment, the broadcasting system highly-compressed rate image data is decoded in error correcting code by a broadcast receiver of such broadcasting system and then recorded and/or reproduced as the input data. If the compressed code of the broadcasting system uses a code such as a convolutional code or the like, then a variable length code that covers a continuous wide range is required in order to effect the error correction. However, when the VTR is operated in a special playback mode, only a part of the picture can be continuously read out at every field. There is then the possibility that the broadcast receiver will not be able to perform the error correction decoding processing adequately. The recording and reproducing apparatus of this embodiment (VTR) can overcome the disadvantages that takes place in the aforesaid case such as when image data of a picture range larger than a picture range that is reproduced as a consecutive code in the special playback mode of the VTR in order to effect the error correction processing of the broadcasting system.

FIG. 10 shows in block form a circuit arrangement of the broadcasting system receiver corresponding to the embodiment. As shown in FIG. 10, this broadcasting system receiver comprises an antenna 140 which receives broadcast radio waves, an RF detecting (demodulating) circuit 141, an ECC decoding circuit 143 of the broadcasting system, a switching circuit 144 for switching the image data that has been processed in an error correction decoding fashion and the reproduced image data output from the VTR, an image data expanding circuit 145 of the broadcasting system, a display monitor 146 for displaying thereon image data, an output terminal 147 from which the variable length code is output to the VTR or the like, and an input terminal 148 from which the image data from the VTR or the like is input. While the ECC decoding circuit 143 corrects an error that takes place in the input image data during the transmission of the broadcasting system image data, the ECC decoding circuit 143 conceals an error that cannot be corrected. To this end, the ECC decoding circuit 143 outputs a conceal processing identifying signal, i.e., a conceal flag. Therefore, the compressed coded image data thus error-corrected and the conceal flag are supplied from the ECC decoding circuit 143 to the image data expanding circuit 145 and the output terminal 147. The image data expanding circuit 145 detects an error portion on the basis of the conceal flag and corrects such error portion by using surrounding image data, thereby effecting the image data expanding.

Figure 11:
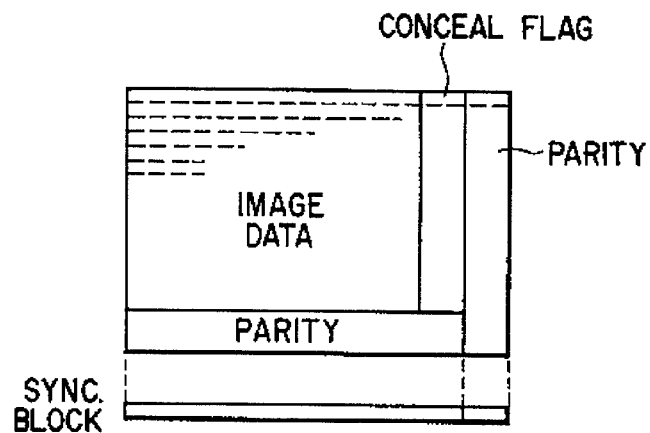
FIG. 11 is a diagram showing a data format according to a further embodiment of the present invention.

The circuit arrangement of this embodiment is fundamentally similar to that of FIG. 2. The compressed variable coded image data that has been error-corrected and the conceal flag are input to this apparatus from the input terminal 9 shown in FIG. 2. FIG. 11 shows an arrangement of an error correcting code block that is the unit with which the ECC encoding circuit 16 (FIG. 2) of this embodiment performs the error correction processing. The ECC encoding circuit 16 re-constructs the above-mentioned image data and the above-mentioned conceal flag at every image portion and generates and adds VTR error correcting parity data to the two data constituents to construct the sync. block. Then, the recording/reproducing circuit 18 performs the recording and/or reproducing at every sync. block. The conceal flag and the image data portion are associated with each other within the same sync. block, thereby making it possible to determine erroneous image data within the sync. block.

Figure 12:
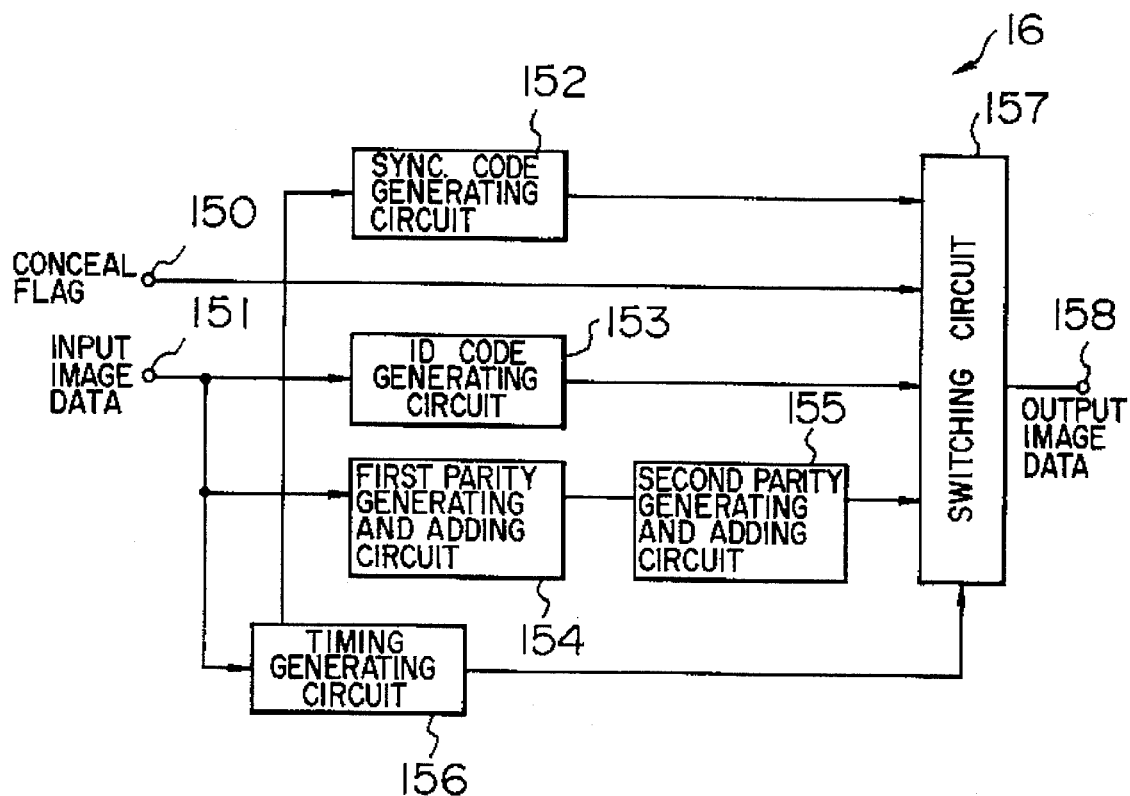
FIG. 12 is a block diagram showing a circuit arrangement of an error correction encoding circuit according to the further embodiment of the present invention shown in FIG. 9.

FIG. 12 shows in block form a circuit arrangement of the ECC encoding circuit 16 that constructs the above-mentioned error correcting code block. As shown in FIG. 12, the ECC encoding circuit 16 comprises a conceal flag input terminal 150, an image data input terminal 151, a sync. code generating circuit 152, an ID (identification) code generating circuit 153, a first parity generating and adding circuit 154, a second parity generating and adding circuit 155, a timing generating circuit 156, a switching circuit 157, and an image data output terminal 158.

The sync. code generating circuit 152 generates the sync. code that indicates the starting portion of the sync. block. The ID code generating circuit 153 generates the ID code that is used to identify respective sync. blocks. The first parity generating and adding circuit 154 generates the parity associated with the image data within the sync. block and adds the parity thus generated to the image data. The second parity generating and adding circuit 155 is supplied with the output signal of the first parity generating circuit 154 to generate the parity extending the sync. blocks and adds the parity thus generated to the image data. The timing generating circuit 156 generates switching timing signals of respective signals. Therefore, on the basis of these switching timing signals, the switching circuit 157 switches the sync. code, the ID code, the image data containing the parity and the conceal flag input thereto from the input terminal 150 to output the same from the output terminal 158 as error-correction encoded image data.

Upon reproducing, the ECC decoding circuit 17 performs the error correction at the unit of the error correction encoding block shown in FIG. 11 and outputs the image data and the conceal flag corresponding to the parts. If an error that cannot be corrected occurs when the VTR performs the recording and/or reproducing, then the ECC encoding circuit 16 re-constructs a conceal flag on the basis of information concerning such error and the reproduced conceal flag and outputs the same.

According to this embodiment, even when the error correcting method in which the image data of the broadcasting system needs the code of the continuous wide range to correct the error is employed, the error-corrected data of the broadcasting system is recorded and/or reproduced by the VTR, whereby the effective variable length code can be output to the broadcast receiver in the special playback mode.

Figure 13:
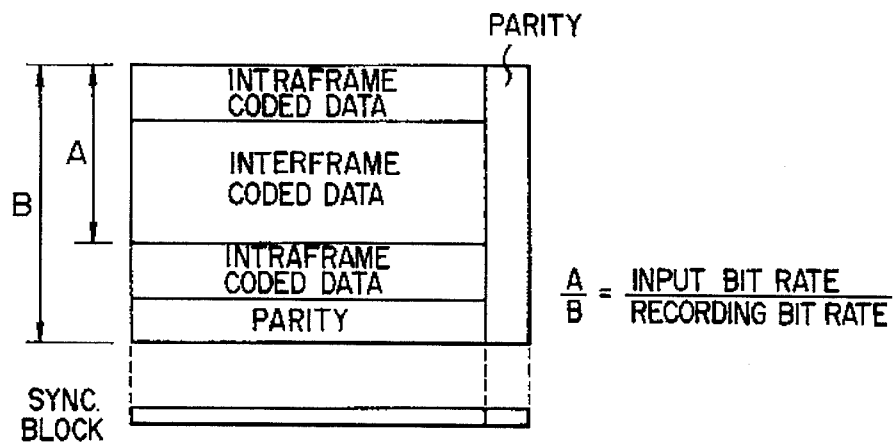
FIG. 13 is a diagram showing a data format according to a still further embodiment of the present invention.
Figure 14:
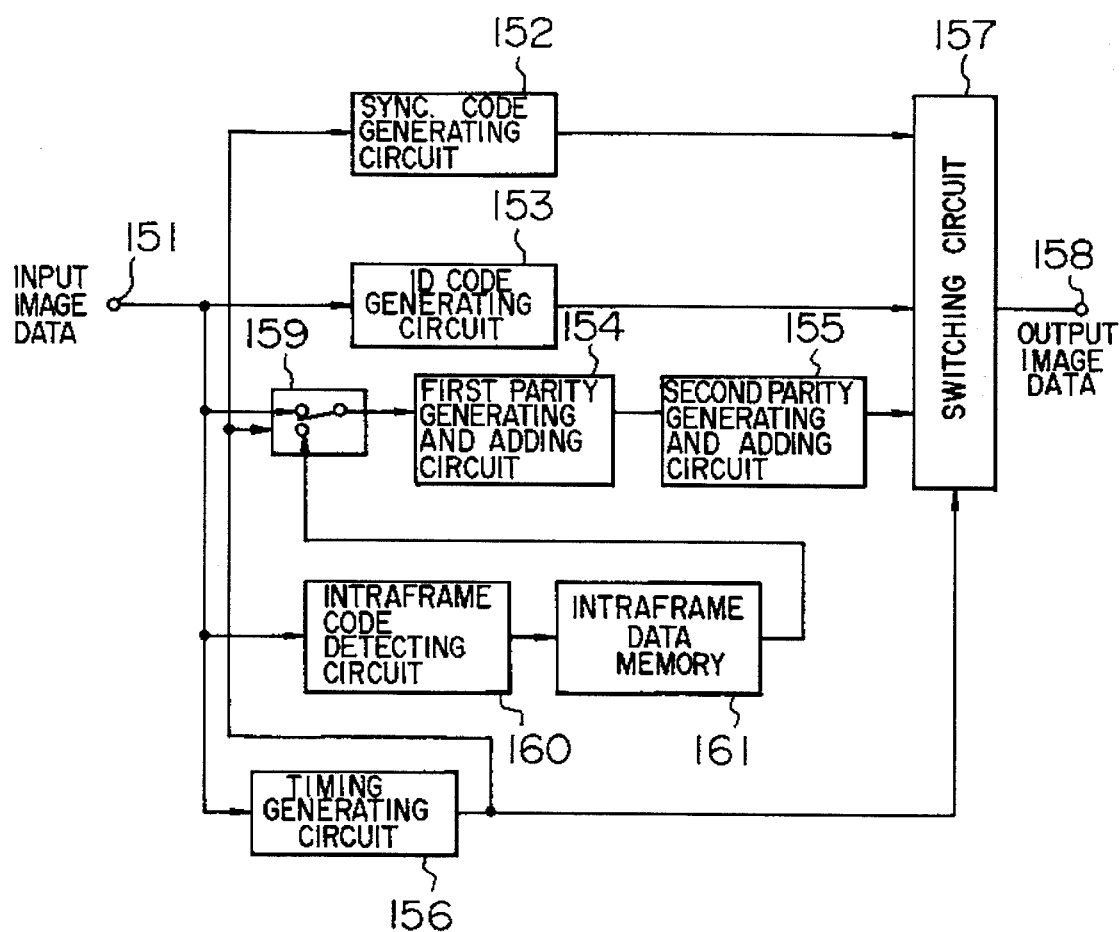
FIG. 14 is a block diagram showing a circuit arrangement of the embodiment according to the present invention shown in FIG. 13.

FIGS. 13 and 14 show a still further embodiment of the present invention. In this embodiment, the VTR recording bit rate is made high enough for the highly-compressed image data of the broadcasting system. A circuit arrangement of this embodiment is fundamentally similar to that of the embodiment shown in FIGS. 11 and 12. When the highly-compressed image data of the broadcasting system is encoded by using interframe information, intraframe coded data becomes more important. FIG. 13 shows an error correction encoding block of this embodiment. When the highly-compressed image data of the broadcasting system and the low-compressed image data of the VTR recording and reproducing system are different in bit rate as shown in FIG. 13, a vacant area of image data takes place in the error correction encoding block. In this embodiment, the intraframe coded data is stored one more time by utilizing this vacant area.

When data that cannot be error-corrected takes place upon recording and/or reproduction, if such error is the intraframe coded data, then such data is replaced with another corresponding data in the ECC decoding circuit 17. With this arrangement, the image data of the variable length code can be recorded and/or reproduced more reliably.

FIG. 14 shows a circuit arrangement of the ECC encoding circuit 16 that carries out the error correction encoding shown in FIG. 13. In FIG. 14, circuit blocks identical to those of FIG. 12 are marked with the same reference numerals and therefore need not be described in detail. In FIG. 14, there are additionally provided a switching circuit 159, an intraframe coded data detecting circuit 160 and an intraframe coded data memory 161.

Figure 15:
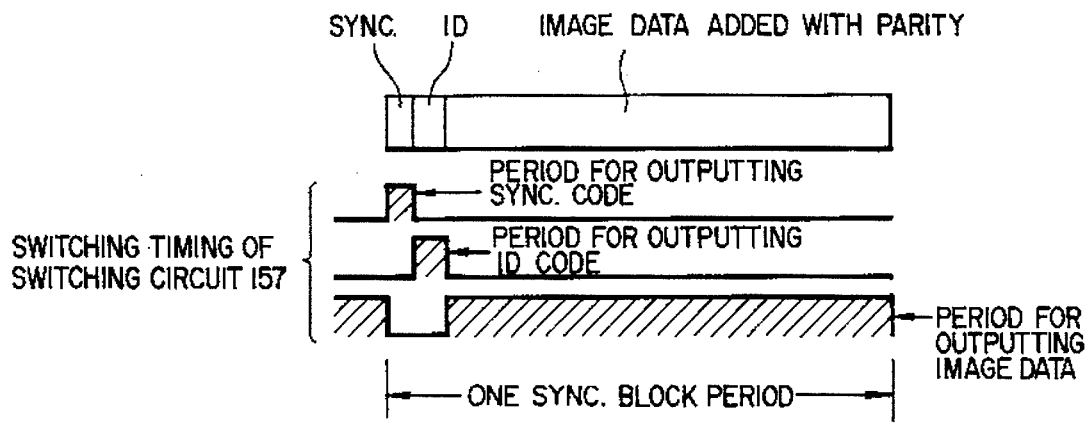
FIGS. 15, 16 are timing chart indicating functions of the block diagram in FIG. 14.
Figure 16:
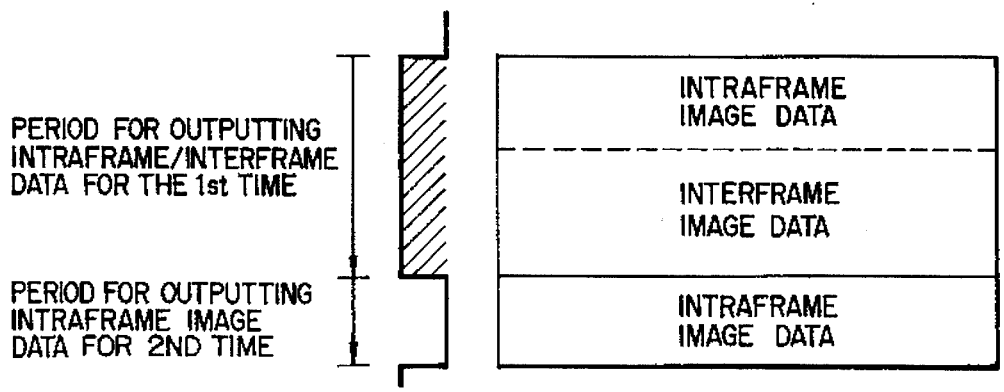

As in FIG. 14, one synch. block is generated by outputting a. sync. code, an ID code and image data which is added with a parity code with switching of switching circuit 157 under a certain timing as shown in FIG. 15 within one sync. block. The image data to which a parity code is added is composed of image data inputted from input terminal 151 and intraframe image data which is detected by intraframe code detecting circuit 160 and then stored in intraframe data memory 161. The image data for an error correction code block is generated by switching between the above two image data by switching with switching circuit 159 at a timing at the end of a period for outputting intraframe image data and interframe image data for the first time as shown in FIG. 16. The above switching timing is generated by timing generating circuit 156. The error correction code block in FIG. 13 is generated.

As set out, according to the various embodiments of the present invention, the variable length coded image data that is the highly-compressed image data of the broadcasting system such as the ATV system or the like can be efficiently recorded and/or reproduced without providing the hardware such as the error correction decoding circuit and the image data expanding circuit of the broadcasting system on the VTR side.

Having described preferred embodiments of the invention with reference to the accompanying drawings, it is to be understood that the invention is not limited to those precise embodiments and that various changes and modifications thereof could be effected therein by one skilled in the art without departing from the spirit or scope of the invention as defined in the appended claims.

What is claimed is:

1. A recording and/or reproducing apparatus for recording and/or reproducing a plurality of image data compressed according to a plurality of mutually different compressing methods, the apparatus comprising:

first receiving means for receiving non-compressed first image data;

image data compressing means for compressing the non-compressed first image data according to a first compressing method to produce compressed first image data after the non-compressed first image data is received by the first receiving means, the compressed first image data thereby constituting self-compressed image data compressed by the recording and/or reproducing apparatus itself;

second receiving means for receiving compressed second image data, the compressed second image data having been produced by an apparatus other than the recording and/or reproducing apparatus by compressing non-compressed second image data according to a second compressing method different from the first compressing method before the compressed second image data is received by the second receiving means, the compressed second image data thereby constituting pre-compressed image data not compressed by the recording and/or reproducing apparatus itself;

selecting means for receiving the compressed first image data and the compressed second image data, and outputting a selected one of the compressed first image data and the compressed second image data to produce selected compressed image data;

error correction encoding means for encoding the selected compressed image data to produce error correction coded data;

recording/reproducing means for recording the error correction coded data on a recording medium to produce recorded error correction coded data, and reproducing the recorded error correction coded data from the recording medium to produce reproduced error correction coded data;

error correction decoding means for decoding the reproduced error correction coded data to produce decoded compressed image data, and correcting errors in the decoded compressed image data to produce error-corrected compressed image data;

image data decompressing means for decompressing the error-corrected compressed image data to produce error-corrected decompressed image data when the error-corrected compressed image data is based on the non-compressed first image data received by the first receiving means;

first output means for outputting the error-corrected decompressed image data to produce output non-compressed first image data corresponding to the non-compressed first image data received by the first receiving means; and second output means for outputting the error-corrected compressed image data to produce output compressed second image data corresponding to the compressed second image data received by the second receiving means;

wherein a resolution of the non-compressed second image data is not lower than a resolution of the non-compressed first image data;

wherein a bit rate of the compressed second image data is not higher than a bit rate of the compressed first image data;

wherein the second compressing method combines an intraframe compressing scheme with an interframe compressing scheme; and wherein the compressed second image data includes intraframe image data produced by compressing the second image data according to the intraframe compression scheme.

2. A recording and/or reproducing apparatus according to claim 1, wherein the compressed second image data is RF-demodulated data from a broadcasting signal and includes an error correction parity code for broadcasting.

3. A recording and/or reproducing apparatus according to claim 1, wherein the compressed second image data is RF-demodulated data from a broadcasting signal and includes an error concealment flag indicative of a residual error in the compressed second image data.

4. A recording and/or reproducing apparatus according to claim 1, wherein the second receiving means includes RF-demodulating means for demodulating a broadcasting signal to produce the compressed second image data; and wherein the second output means includes RF-modulating means for modulating the output compressed second image data.

5. A recording and/or reproducing apparatus for recording and/or reproducing a plurality of image data compressed according to a plurality of mutually different compressing methods, the apparatus comprising:

first receiving means for receiving non-compressed first image data;

image data compressing means for compressing the non-compressed first image data according to a first compressing method to produce compressed first image data after the non-compressed first image data is received by the first receiving means, the compressed first image data thereby constituting self-compressed image data compressed by the recording and/or reproducing apparatus itself;

second receiving means for receiving compressed second image data, the compressed second image data having been produced by an apparatus other than the recording and/or reproducing apparatus by compressing non-compressed second image data according to a second compressing method different from the first compressing method before the compressed second image data is received by the second receiving means, the compressed second image data thereby constituting pre-compressed image data not compressed by the recording and/or reproducing apparatus itself;

selecting means for receiving the compressed first image data and the compressed second image data, and outputting a selected one of the compressed first image data and the compressed second image data to produce selected compressed image data;

error correction encoding means for encoding the selected compressed image data to produce error correction coded data;

recording/reproducing means for recording the error correction coded data on a recording medium to produce recorded error correction coded data, and reproducing the recorded error correction coded data from the recording medium to produce reproduced error correction coded data;

error correction decoding means for decoding the reproduced error correction coded data to produce decoded compressed image data, and correcting errors in the decoded compressed image data to produce error-corrected compressed image data;

image data decompressing means for decompressing the error-corrected compressed image data to produce error-corrected decompressed image data when the error-corrected compressed image data is based on the non-compressed first image data received by the first receiving means;

first output means for outputting the error-corrected decompressed image data to produce output non-compressed first image data corresponding to the non-compressed first image data received by the first receiving means; and second output means for outputting the error-corrected compressed image data to produce output compressed second image data corresponding to the compressed second image data received by the second receiving means;

wherein a resolution of the non-compressed second image data is not lower than a resolution of the non-compressed first image data;

wherein a bit rate of the compressed second image data is not higher than a bit rate of the compressed first image data;

wherein the recording/reproducing means is selectively operable at a high recording/reproducing bit rate and a low recording/reproducing bit rate lower than the high recording/reproducing bit rate; and wherein the recording/reproducing means records the error correction coded data at the high bit rate when the selected compressed image data is the compressed first image data, and records the error correction coded data at the low bit rate when the selected compressed image data is the compressed second image data.

6. A recording and/or reproducing apparatus according to claim 5, wherein the non-compressed first image data is one of high-resolution non-compressed first image data having a high resolution and low-resolution non-compressed first image data having a low resolution lower than the high resolution; and wherein the recording/reproducing means records the error correction coded data at the high bit rate when the selected compressed image data is the compressed first image data and the non-compressed first image data is the high-resolution non-compressed first image data, and records the error correction coded data at the low bit rate when the selected compressed image data is the compressed first image data and the non-compressed first image data is the low-resolution non-compressed first image data.

7. A recording and/or reproducing apparatus according to claim 6, wherein the compressed second image data is RF-demodulated data from a broadcasting signal and includes an error correction parity code for broadcasting.

8. A recording and/or reproducing apparatus according to claim 6, wherein the compressed second image data is RF-demodulated data from a broadcasting signal and includes an error concealment flag indicative of a residual error in the compressed second image data.

9. A recording and/or reproducing apparatus according to claim 6, wherein the second receiving means includes RF-demodulating means for demodulating a broadcasting signal to produce the compressed second image data; and wherein the second output means includes RF-modulating means for modulating the output compressed second image data.

10. A recording and/or reproducing apparatus according to claim 5, wherein the compressed second image data is RF-demodulated data from a broadcasting signal and includes an error correction parity code for broadcasting.

11. A recording and/or reproducing apparatus according to claim 5, wherein the compressed second image data is RF-demodulated data from a broadcasting signal and includes an error concealment flag indicative of a residual error in the compressed second image data.

12. A recording and/or reproducing apparatus according to claim 5, wherein the second receiving means includes RF-demodulating means for demodulating a broadcasting signal to produce the compressed second image data; and wherein the second output means includes RF-modulating means for modulating the output compressed second image data.

13. A recording and/or reproducing apparatus for recording and/or reproducing a plurality of image data compressed according to a plurality of mutually different compressing methods, the apparatus comprising:

first receiving means for receiving non-compressed first image data;

image data compressing means for compressing the non-compressed first image data according to a first compressing method to produce compressed first image data;

second receiving means for receiving compressed second image data, the compressed second image data having been produced by compressing non-compressed second image data according to a second compressing method different from the first compressing method;

selecting means for receiving the compressed first image data and the compressed second image data, and outputting a selected one of the compressed first image data and the compressed second image data to produce selected compressed image data;

error correction encoding means for encoding the selected compressed image data to produce error correction coded data;

recording/reproducing means for recording the error correction coded data on a recording medium to produce recorded error correction coded data, and reproducing the recorded error correction coded data from the recording medium to produce reproduced error correction coded data;

error correction decoding means for decoding the reproduced error correction coded data to produce decoded compressed image data, and correcting errors in the decoded compressed image data to produce error-corrected compressed image data;

image data decompressing means for decompressing the error-corrected compressed image data to produce error-corrected decompressed image data when the error-corrected compressed image data is based on the non-compressed first image data received by the first receiving means;

first output means for outputting the error-corrected decompressed image data to produce output non-compressed first image data corresponding to the non-compressed first image data received by the first receiving means; and second output means for outputting the error-corrected compressed image data to produce output compressed second image data corresponding to the compressed second image data received by the second receiving means;

wherein a resolution of the non-compressed second image data is not lower than a resolution of the non-compressed first image data;

wherein a bit rate of the compressed second image data is not higher than a bit rate of the compressed first image data;

wherein the second compressing method combines an intraframe compressing scheme with an interframe compressing scheme;

wherein the compressed second image data includes intraframe image data produced by compressing the second image data according to the intraframe compression scheme;

wherein the error correction encoding means includes means, operable when the selected compressed image data is the compressed second image data, for extracting at least part of the intraframe image data from the compressed second image data to produce duplicate intraframe image data, multiplexing the compressed second image data with the duplicate intraframe image data to produce multiplexed compressed second image data, and encoding the multiplexed compressed second image data to produce error correction encoded data; and wherein a bit rate of the duplicate intraframe image data is not higher than a difference between a recording/reproducing bit rate of the recording/reproducing means and the bit rate of the compressed second image data.

14. A recording and/or reproducing apparatus according to claim 13, wherein the compressed second image data is RF-demodulated data from a broadcasting signal and includes an error correction parity code for broadcasting.

15. A recording and/or reproducing apparatus according to claim 13, wherein the compressed second image data is RF-demodulated data from a broadcasting signal and includes an error concealment flag indicative of a residual error in the compressed second image data.

16. A recording and/or reproducing apparatus according to claim 13, wherein the second receiving means includes RF-demodulating means for demodulating a broadcasting signal to produce the compressed second image data; and wherein the second output means includes RF-modulating means for modulating the output compressed second image data.

17. A recording and/or reproducing method for recording and/or reproducing a plurality of image data compressed according to a plurality of mutually different compressing methods, the method comprising the steps of:

receiving non-compressed first image data;

compressing the non-compressed first image data according to a first compressing method to produce compressed first image data after the non-compressed first image data is received in the step of receiving non-compressed first image data, the compressed first image data thereby constituting self-compressed image data compressed by the recording and/or reproducing method itself;

receiving compressed second image data, the compressed second image data having been produced in a step not included in the recording and/or reproducing method by compressing non-compressed second image data according to a second compressing method different from the first compressing method before the compressed second image data is received in the step of receiving compressed second image data, the compressed second image data thereby constituting pre-compressed image data not compressed by the recording and/or reproducing method itself;

selecting one of the compressed first image data and the compressed second image data to produce selected compressed image data;

encoding the selected compressed image data to produce error correction coded data;

recording the error correction coded data on a recording medium to produce recorded error correction coded data;

reproducing the recorded error correction coded data from the recording medium to produce reproduced error correction coded data;

decoding the reproduced error correction coded data to produce decoded compressed image data;

correcting errors in the decoded compressed image data to produce error-corrected compressed image data;

decompressing the error-corrected compressed image data to produce error-corrected decompressed image data when the error-corrected compressed image data is based on the non-compressed first image data received in the step of receiving non-compressed first image data;

outputting the error-corrected decompressed image data to produce output non-compressed first image data corresponding to the non-compressed first image data received in the step of receiving non-compressed first image data; and outputting the error-corrected compressed image data to produce output compressed second image data corresponding to the compressed second image data received in the step of receiving compressed second image data;

wherein a resolution of the non-compressed second image data is not lower than a resolution of the non-compressed first image data;

wherein a bit rate of the compressed second image data is not higher than a bit rate of the compressed first image data;

wherein the second compressing method combines an intraframe compressing scheme with an interframe compressing scheme; and wherein the compressed second image data includes intraframe image data produced by compressing the second image data according to the intraframe compression scheme.

* * * * *